Patented Sept. 19, 1933

1,927,066

UNITED STATES PATENT OFFICE 1,927,066

COMPOSITION OF MATTER

Edgar H. Gorsuch, Grand Rapids, Mich., and Ansel M. Kinney, Chicago, Ill., assignors to Standard Oil Company of Indiana, Whiting, Ind., a corporation of Indiana No Drawing. Application June 15, 1927
Serial No. 199,125

6 Claims. (Cl. 18—53)

The present invention relates to a composition of matter for use as a dressing for preventing adhesion of rubber articles to molding members during vulcanization. The composition is particularly effective in preventing such adhesion where rubber molding members are employed as, for example, where inflated rubber bags are used as interior molds in the manufacture of tires.

Heretofore a dressing comprising water, glycerine, and usually a small quantity of pumice, powdered mica or the like, has been used for this purpose. For good results it has been necessary to employ a large percentage, usually about 20–25% of glycerine. It has now been found that equally satisfactory or better results can be obtained by the use of an emulsion containing a much reduced quantity of glycerine, mineral oil, water and an emulsifying agent, preferably alkali-metal sulfonates derived from mineral oil.

When alkali-metal sulfonates derived from mineral oil are employed as emulsifying agents in connection with the composition of the present invention, it has been found that they themselves are effective in preventing adhesion of the mold and the article being vulcanized. In the composition of the present invention, the glycerine prevents the sulfonates from acquiring under the vulcanizing temperature conditions, a viscous or resinous consistency which would cause the article being vulcanized and the mold to adhere together. The glycerine also has, as well, the desired softening effect upon the mold.

The amounts of the various ingredients may vary within very wide limits. The glycerine content will usually be less than about 5% of the emulsion. The oil may vary within wide limits, for example, between 7 and 25%. The emulsifying agents should be present in sufficient quantities to ensure a permanent emulsion.

The oil employed is preferably a mineral oil distillate such as straw oil. As emulsifying agents, it is preferred to employ the preferentially oil soluble sulfonates of alkali metals derived from mineral oil as described in Patent No. 1,286,179 issued November 26, 1918 to Humphreys or otherwise. Other emulsifying agents may be employed if desired, for example, the alkali metal salts of the so-called "green acids" derived from mineral oil as described in Patent No. 1,474,933 issued November 20, 1923 to Humphreys and others or otherwise. The so-called soluble oils which comprise an oil and an emulsifying agent may be mixed with glycerine and water for the production of the desired emulsion.

The following example will enable the invention to be more fully understood.

| | |
|---|---|
| Straw oil | 14% |
| Water | 76% |
| Alkali sulfonates | 4% |
| Glycerine | 5% |
| Rosin soap | 1% |
| Alcohol | Trace |

While the invention has been described with reference to certain specific proportions and certain specified substances, it must be understood that it is not intended to be limited thereby except by the terms of the appended claims.

We claim:

1. As a composition of matter for the purpose described, an emulsion comprising not more than 5% of glycerine, between 7 and 25% of mineral oil, water and preferentially oil soluble sulfonates of alkali metals derived from mineral oil.

2. As a composition of matter for the purpose described, an emulsion comprising 5% glycerine, 14% straw oil, 76% water, 4% alkali sulfonates, and 1% rosin soap.

3. The method of preventing adhesion of rubber articles to molding members during vulcanization which consists in applying between said articles and molding members an emulsion comprising not more than 5% of glycerine, between 7% and 25% of mineral oil, water and preferentially oil soluble sulfonates of alkali metals derived from mineral oil.

4. The method of preventing adhesion of rubber articles to molding members during vulcanization which consists in applying between said articles and molding members an emulsion comprising 5% glycerine, 14% straw oil, 76% water, 4% alkali sulfonates, and 1% rosin soap.

5. A composition of matter for the purpose described comprising water, mineral oil, a lesser amount of an emulsifying agent, and a small amount of glycerine.

6. A composition of matter for the purpose described, comprising water, mineral oil, a small amount of an emulsifying agent, and not more than about 5% of glycerine.

EDGAR H. GORSUCH.
ANSEL M. KINNEY.